United States Patent
Schaefer et al.

(10) Patent No.: US 10,589,609 B2
(45) Date of Patent: Mar. 17, 2020

(54) VEHICULAR WINDOW TRIM ASSEMBLY AND DECORATIVE MOLDING ASSEMBLY FOR VEHICLE DOOR FRAME

(71) Applicant: JVIS-USA, LLC, Sterling Heights, MI (US)

(72) Inventors: Donald R. Schaefer, Waterford, MI (US); Jason T. Murar, Macomb, MI (US)

(73) Assignee: JVIS-USA, LLC, Sterling Heights, MI (US)

( * ) Notice: Subject to any disclaimer, the term of this patent is extended or adjusted under 35 U.S.C. 154(b) by 110 days.

(21) Appl. No.: 15/497,555

(22) Filed: Apr. 26, 2017

(65) Prior Publication Data

US 2018/0312048 A1  Nov. 1, 2018

(51) Int. Cl.
*B60J 10/235* (2016.01)
*B60J 10/74* (2016.01)
*B60J 5/04* (2006.01)
*B60J 10/32* (2016.01)

(52) U.S. Cl.
CPC .......... *B60J 10/235* (2016.02); *B60J 5/0402* (2013.01); *B60J 10/32* (2016.02); *B60J 10/74* (2016.02)

(58) Field of Classification Search
CPC .................. B60J 10/235; B60J 10/74
See application file for complete search history.

(56) References Cited

U.S. PATENT DOCUMENTS

| | | | |
|---|---|---|---|
| 4,800,681 A | | 1/1989 | Skillen et al. |
| 4,823,511 A | * | 4/1989 | Herliczek ............... B60J 10/74 428/83 |
| 4,853,520 A | * | 8/1989 | Hochart ................ B60J 10/235 219/535 |
| 5,024,480 A | | 6/1991 | Petrelli |
| 5,042,200 A | | 8/1991 | Ugawa |
| 5,056,850 A | | 10/1991 | Katcherian et al. |
| 5,168,668 A | | 12/1992 | Mishima et al. |
| 5,174,066 A | | 12/1992 | Dupuy |
| 5,343,609 A | * | 9/1994 | McManus ............. B60J 10/235 264/177.17 |
| 5,356,194 A | | 10/1994 | Takeuchi |

(Continued)

FOREIGN PATENT DOCUMENTS

| | | | | |
|---|---|---|---|---|
| DE | 29812428 U1 | * | 11/1999 | ............ B60J 10/235 |
| DE | 19845422 A1 | * | 4/2000 | ............ B60J 10/235 |

(Continued)

OTHER PUBLICATIONS

Machine translation of DE29812428.*

*Primary Examiner* — Marcus Menezes
(74) *Attorney, Agent, or Firm* — Brooks Kushman P.C.

(57) ABSTRACT

A vehicular window trim assembly includes a decorative outer trim member and first and second channel members fixedly connected together at overlapping portions of the channel members to form an inverted, U-shaped retainer to receive and retain a window seal. A central portion of the retainer is formed by the overlapping portions. A first leg portion of the retainer is formed by the first channel member and a second leg portion of the retainer is formed by the second channel member. Each of the channel members is integrally molded to form a unitary construction.

16 Claims, 5 Drawing Sheets

(56) References Cited

U.S. PATENT DOCUMENTS

| | | | |
|---|---|---|---|
| 5,358,764 A * | 10/1994 | Roberts | B29C 47/003 |
| | | | 296/93 |
| 5,702,148 A | 12/1997 | Vaughan et al. | |
| 6,279,987 B1 | 8/2001 | Keeney et al. | |
| 6,557,304 B2 | 5/2003 | Ellis | |
| 6,572,176 B2 | 6/2003 | Davis et al. | |
| 6,668,490 B2 | 12/2003 | Hock et al. | |
| 6,817,651 B2 | 11/2004 | Carvalho et al. | |
| 7,350,849 B2 * | 4/2008 | Roush | B60J 10/235 |
| | | | 296/146.9 |
| 7,874,104 B2 | 1/2011 | Kimoto et al. | |
| 8,186,741 B2 | 5/2012 | Lynam et al. | |
| 8,205,389 B1 | 6/2012 | Kesh | |
| 8,434,267 B2 | 5/2013 | Bocutto | |
| 8,840,170 B2 | 9/2014 | Zimmer et al. | |
| 8,919,846 B2 | 12/2014 | Maass | |
| 8,978,306 B2 | 3/2015 | Prater et al. | |
| 8,979,164 B2 * | 3/2015 | Jabra | B60J 10/235 |
| | | | 296/93 |
| 9,114,693 B2 * | 8/2015 | Prater | B60J 10/88 |
| 9,493,061 B2 | 11/2016 | Goto et al. | |
| 2006/0037249 A1 * | 2/2006 | Kawamura | B60J 10/74 |
| | | | 49/414 |
| 2011/0204671 A1 * | 8/2011 | Baratin | B60J 10/235 |
| | | | 296/93 |

FOREIGN PATENT DOCUMENTS

| | | | | |
|---|---|---|---|---|
| EP | 0279998 A1 * | 8/1988 | | B60J 10/235 |
| EP | 0733507 A1 * | 9/1996 | | B60J 10/79 |
| EP | 0734896 A1 * | 10/1996 | | B60J 10/79 |
| JP | 2012106715 A * | 6/2012 | | B60J 10/88 |

* cited by examiner

VEHICULAR WINDOW TRIM ASSEMBLY AND DECORATIVE MOLDING ASSEMBLY FOR VEHICLE DOOR FRAME

TECHNICAL FIELD

This invention generally relates to vehicular window trim assemblies and decorative molding assemblies for vehicle door frames.

Overview

There is an ongoing need to reduce the weight of various automotive components. The reduction of weight makes for more fuel efficient vehicles. It is estimated that every 10% reduction in vehicle weight results in a 5% to 7% reduction in fuel usage. Current economic and environmental concerns make the creation of more fuel efficient cars a top priority in the automotive industry.

The use of high performance plastics typically not only reduces the weight of an automotive component, but also provides the additional following advantages:

minimal corrosion, allowing for longer vehicle life substantial design freedom, allowing advanced creativity and innovation flexibility in integrating components safety, comfort and economy recyclability The following three plastics are high performance, automotive plastics which are rigid and relatively stable in a wide temperature range (i.e. −40° F. to 140° F.).

ABS

Acrylonitrile Butadiene Styrene is a copolymer made by polymerizing styrene and acrylonitrile in the presence of polybutadiene. The styrene gives the plastic a shiny, impervious surface. The butadiene, a rubbery substance, provides resilience even at low temperatures (i.e. −40° F.). A variety of modifications can be made to the plastic to improve impact resistance, toughness, and heat resistance.

Automotive Applications: automotive body parts, dashboards, wheel covers.

Polycarbonate (PC)

Amorphous polycarbonate polymer offers a unique combination of stiffness, hardness and toughness. It exhibits excellent weathering, creep, impact, optical, electrical and thermal properties. Because of its extraordinary impact strength, it is used for helmets of all kinds and bullet-proof glass substitutes.

Automotive Applications: bumpers, headlamp lenses.

ASA (Acrylonitrile Styrene Acrylate)

Similar to ABS, ASA has great toughness and rigidity, good chemical resistance and thermal stability, outstanding resistance to weather, aging and yellowing, and high gloss.

Automotive Applications: housings, profiles, interior parts and outdoor applications.

There is also an ongoing need to make automobiles more aerodynamic (i.e. less drag or low coefficient of drag) to improve fuel economy and enhance vehicle performance.

There is also an ongoing need to provide improved exterior seals especially for exterior decorative surround molding assemblies for automotive windows.

Figure 1:
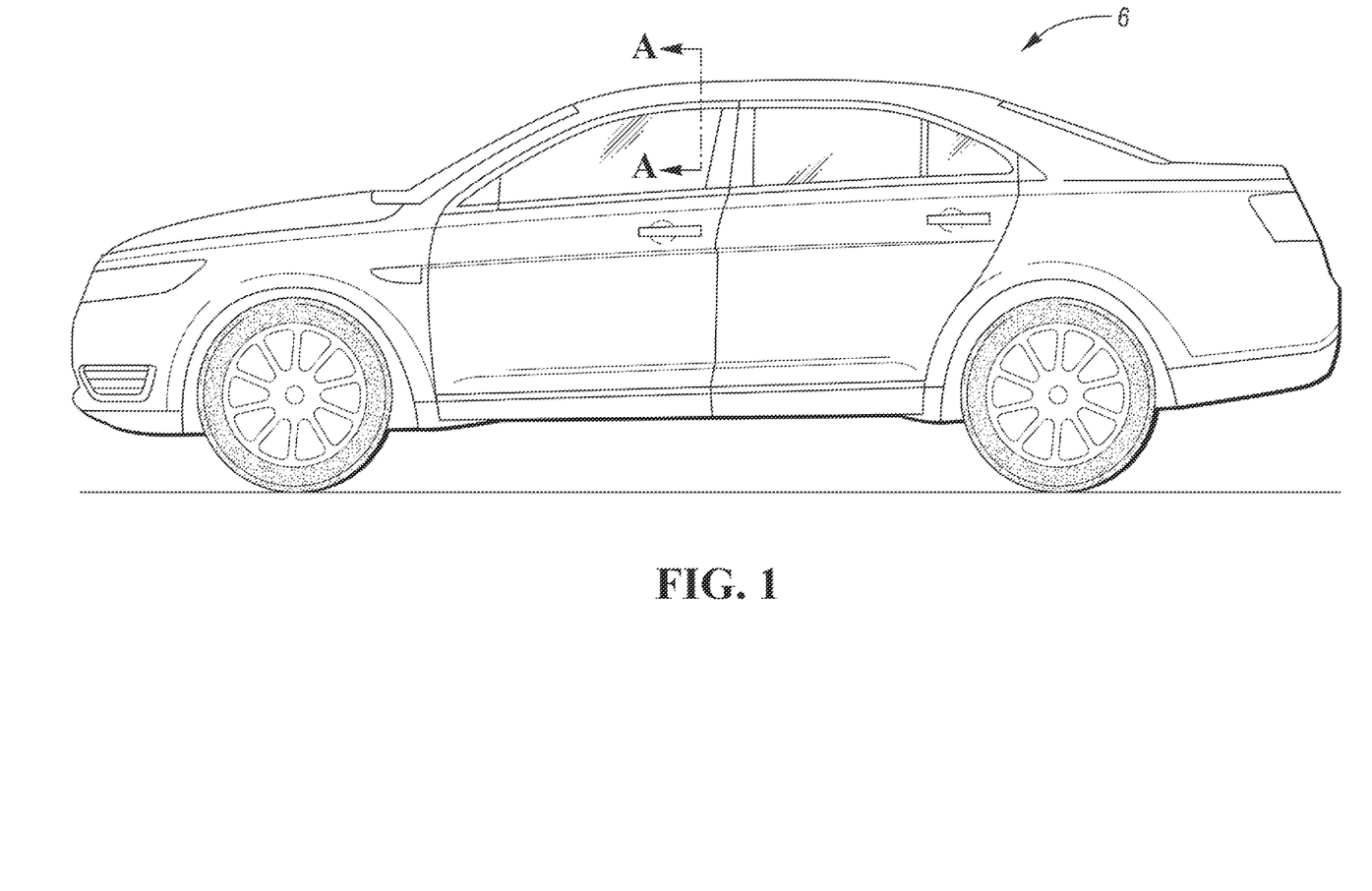
FIG. 1 is a side schematic view of a passenger vehicle or automobile, generally indicated at 6.
Figure 2:
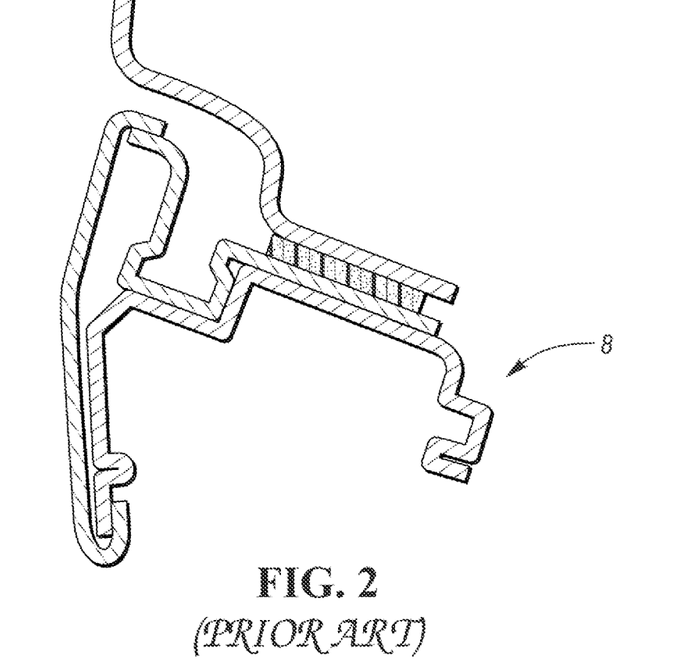
FIG. 2 is a sectional view, taken along lines A-A of FIG. 1 and partially broken away, of a prior art metal vehicular window trim assembly, generally indicated at 8, adhesively secured to vehicle door frame.
Figure 3:
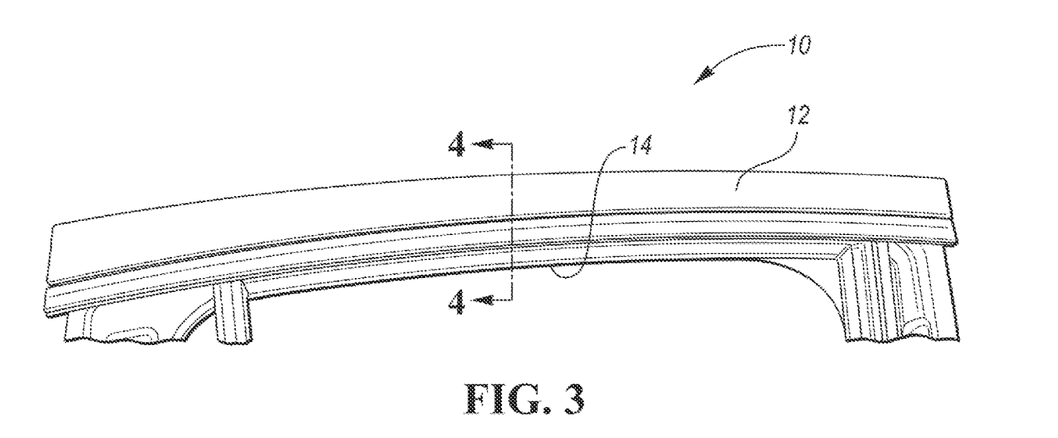
FIG. 3 is a side elevational view, partially broken away, of a vehicle metal door frame and window trim assembly constructed in accordance with at least one embodiment of the present invention.
Figure 4:
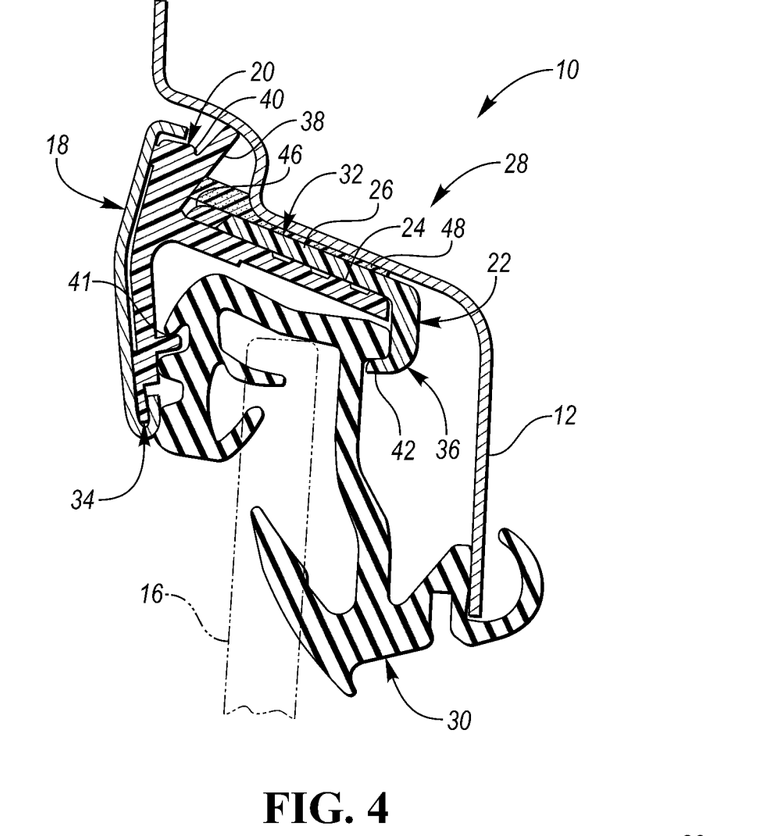
FIG. 4 is a sectional view, taken along lines 4-4 of FIG. 3 and partially broken away, of the trim assembly of FIG. 3 with a pane of glass indicated by phantom lines held or retained within a window seal.

As described in U.S. Pat. No. 5,702,148 and generally referring now to FIGS. 1 and 2, conventionally, automotive window surround moldings are comprised of multiple pieces, and provide little or no structural support for sealing the window which they are associated with. Further, conventional sealing systems used with translational window panes in automobiles are directly attached to a weld flange associated with the window aperture, or to channels which are attached to the structure surrounding the window aperture prior to installation of the glass run.

Glass run channels are used in automotive vehicles and the like to support window panes which translationally move between open and closed positions. The glass run channel guides the window pane along the front and rear vertical edges during translational movement between the open and closed positions, and supports the window pane so as to form a seal between the window pane and the vehicle door or body structure. The seal is required to prevent the outside elements from entering the passenger compartment and contacting either the passenger or the interior of the vehicle.

The structural integrity of the glass run channel must be sufficient to prevent the window pane from experiencing significant movement other than in the intended translational direction. The glass run channel must also allow the window pane translational movement without undue resistance.

Decorative moldings are often used in association with glass run channels to improve the appearance of the exterior edge of the glass run channel. Some moldings are attached to or molded into the exterior portion of the seal, while others are fastened to the structure of the door or body surrounding the window. Under either method the glass run channel is attached directly to the weld flange or to channels which are attached to the surrounding structure in an additional operation during final assembly. Generally, multiple operations are required to fasten the prior art glass run channel, belt weather strip, and decorative molding.

Often the prior art decorative moldings are comprised of two or more pieces. For example, one piece is attached along the belt line of the window opening, a second piece is attached along the B pillar, top of window, and A pillar areas of the window opening, and a third piece of molding is attached near the A pillar/Belt line junction where an exterior rear view mirror is often positioned. Further, even when the decorative molding is incorporated in the glass run channel by insert molding (or alternate attachment methods), there are still multiple pieces required for the belt line area, the B pillar/top of window/A pillar, and the mirror area. Each additional piece which must be assembled to the vehicle along the final assembly line has a greater assembly cost associated with it than if the parts can be assembled into a larger sub-assembly remote from the final assembly line.

Another disadvantage of attaching multiple pieces to the vehicle, verses having a sub-assembly, is that the quality of the fit and finish of the pieces is less controlled. For example, the length of the weld flange around the entire window aperture must be controlled to provide a uniform appearance and proper sealing of the glass run channel and belt line seal if attached directly to the flange. There is an inherent cost associated with controlling this entire edge during stamping and forming. Also, there is an additional cost associated with the tooling fixtures which are required during assembly of the door inner panel to the door outer panel to ensure that the weld flange is uniform. It is generally accepted within the industry that reducing the number or length of areas which have "critical" or "significant" dimensional characteristics reduces the cost of the component and provides a more robust design.

The following U.S. patents are related to the present invention: U.S. Pat. Nos. 4,800,681; 5,024,480; 5,042,200; 5,056,850; 5,168,668; 5,174,066; 5,356,194; 5,702,148; 6,279,987; 6,557,304; 6,572,176; 6,668,490; 6,817,651; 7,874,104; 8,186,741; 8,205,389; 8,434,267; 8,840,170; 8,919,846; 8,978,306; 9,114,693; and 9,493,061.

In prior motor vehicle window weatherseal constructions, a variety of materials have been used, such as thermoplastics, thermosets and metal. While each of these materials is separately recyclable, the construction of prior weatherseals has precluded economically viable separation of the various constituents for recycling.

Therefore, a need exists for a window seal assembly that can accommodate the spectrum of required seal functions, while providing an aesthetically pleasing appearance. The need further exists for the seal assembly to reduce installation time and complexity, thereby reducing installation costs. There is also a need to overcome the obstacles to recycling as presented by the traditional use of rubber, plastic and metal combinations within a given weatherseal.

SUMMARY OF EXAMPLE EMBODIMENTS

An object of at least one embodiment of the present invention is to provide a lightweight, low cost, vehicular window trim assembly to seal the vehicle interior from weather, dirt, debris and noise.

Another object is to provide such an assembly wherein injection molding is utilized to produce parts of relatively complex shape with precise dimensional control.

In carrying out the above objects and other objects of at least one embodiment of the present invention, a vehicular window trim assembly is provided. The assembly includes a decorative outer trim member and first and second channel members fixedly connected together at overlapping portions of the channel members to form an inverted, U-shaped retainer to receive and retain a window seal. A central portion of the retainer is formed by the overlapping portions. A first leg portion of the retainer is formed by the first channel member and a second leg portion of the retainer is formed by the second channel member. Each of the channel members is integrally molded to form a unitary construction.

The first channel member may include an upwardly extending, anti-rotation rib portion configured to sealingly engage a body of the vehicle and to reduce rotation of the assembly during closure of a window pane.

The first channel member may be T-shaped. The anti-rotation rib portion may be formed at an upper tip portion of the T-shaped channel member.

Each of the leg portions includes an inwardly extending retaining flange to receive and retain the window seal.

The assembly may further include a plurality of spaced, standoff rib portions extending downwardly from the central portion of the U-shaped retainer.

The first channel member may be T-shaped and the second channel member may be J-shaped.

The trim member may be a metallic trim member.

The channel members may be molded from at least one thermoplastic.

The at least one thermoplastic may be a thermoplastic blend.

The assembly may further include an adhesive sealant to fixedly connect the overlapping portions of the channel members together. The adhesive sealant may be a polyurethane adhesive sealant.

The assembly may further include foam seal tape to adhesively and sealingly secure the central portion of the retainer to a body of the vehicle.

The metallic trim member may be comprised of a nickel chromium alloy.

The metallic trim member may be comprised of a nickel containing stainless steel alloy.

Further in carrying out the above objects and other objects of at least one embodiment of the present invention, a decorative molding assembly for a vehicle door frame having a window opening for a translating window pane moveable between an open position and a closed position is provided. The assembly includes a decorative outer trim member and first and second channel members fixedly connected together at overlapping portions of the channel members to form an inverted, U-shaped retainer to receive and retain a window pane seal. A central portion of the retainer is formed by the overlapping portions. A first leg portion of the retainer is formed by the first channel member and a second leg portion of the retainer is formed by the second channel member. Each of the channel members is integrally molded to form a unitary construction.

The first channel member may include an upwardly extending, anti-rotation rib portion configured to sealingly engage the door frame and to reduce rotation of the assembly during closure of the window pane.

The first channel member may be T-shaped wherein the anti-rotation rib portion may be formed at an upper tip portion of the T-shaped channel member.

Each of the leg portions may include an inwardly extending retaining flange to receive and retain the window pane seal.

The assembly may further include a plurality of spaced, standoff rib portions extending downwardly from the central portion of the U-shaped retainer.

The first channel member may be T-shaped and the second channel member may be J-shaped.

The trim member may be a metallic trim member.

The channel members may be molded from at least one thermoplastic.

Other technical advantages will be readily apparent to one skilled in the art from the following figures, descriptions and claims. Moreover, while specific advantages have been enumerated, various embodiments may include all, some or none of the enumerated advantages.

DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 5:
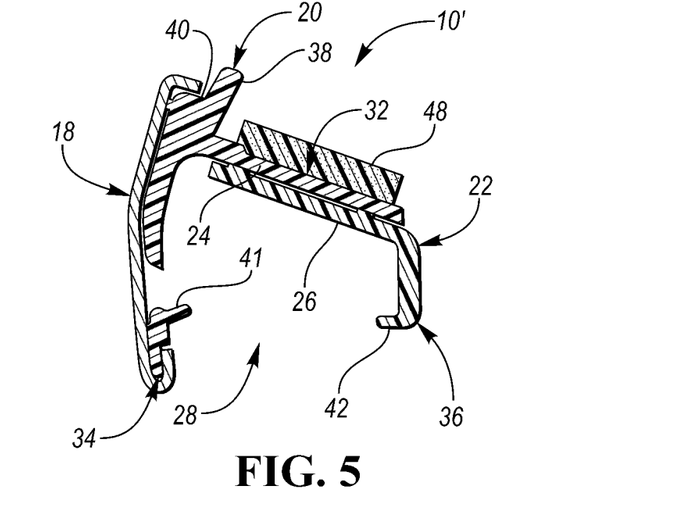
FIG. 5 is a sectional view, taken along lines 5-5 of FIG. 7 and partially broken away, of the trim assembly of FIG. 7.
Figures 6, 7:
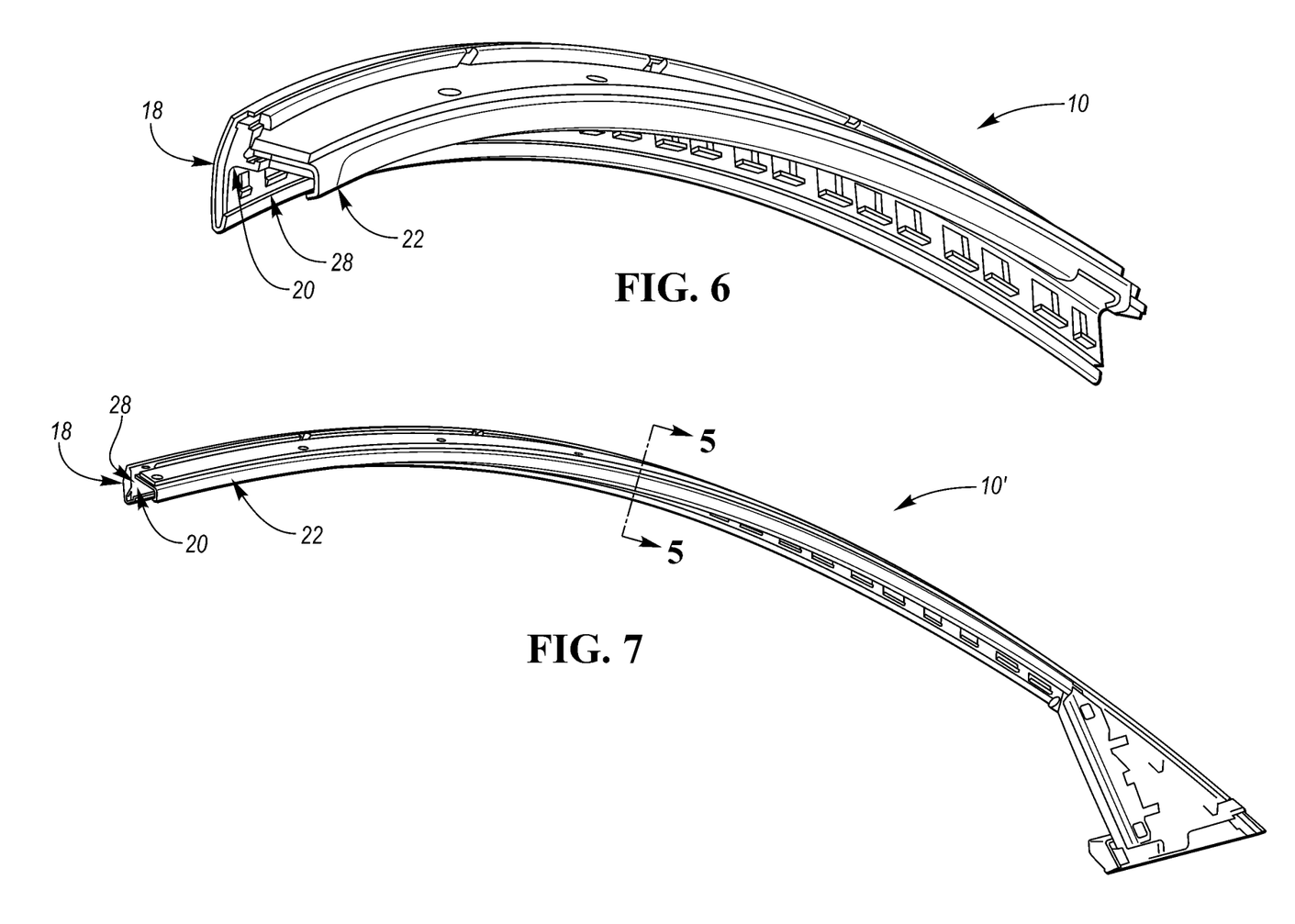
FIG. 6 is a side perspective view of a trim assembly of at least one embodiment of the present invention for use in a rear passenger door frame.
FIG. 7 is a side perspective view of a trim assembly of at least one embodiment of the present invention for use in a driver's side door frame.
Figure 8:
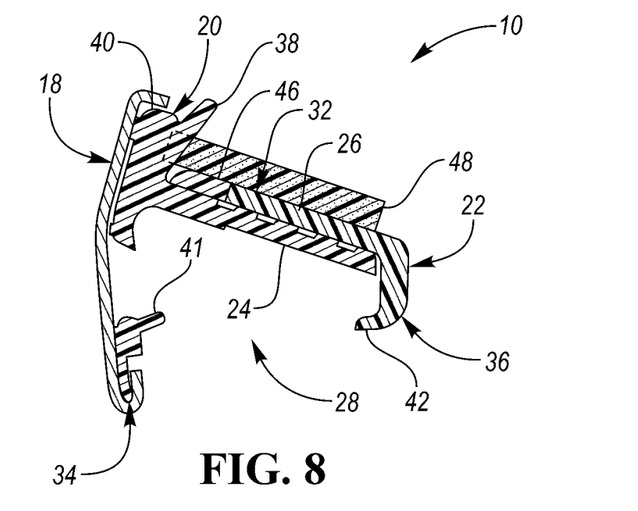
FIG. 8 is a view of the trim assembly of FIG. 4 but without the pane of glass, the window seal and the door frame.
Figure 9:
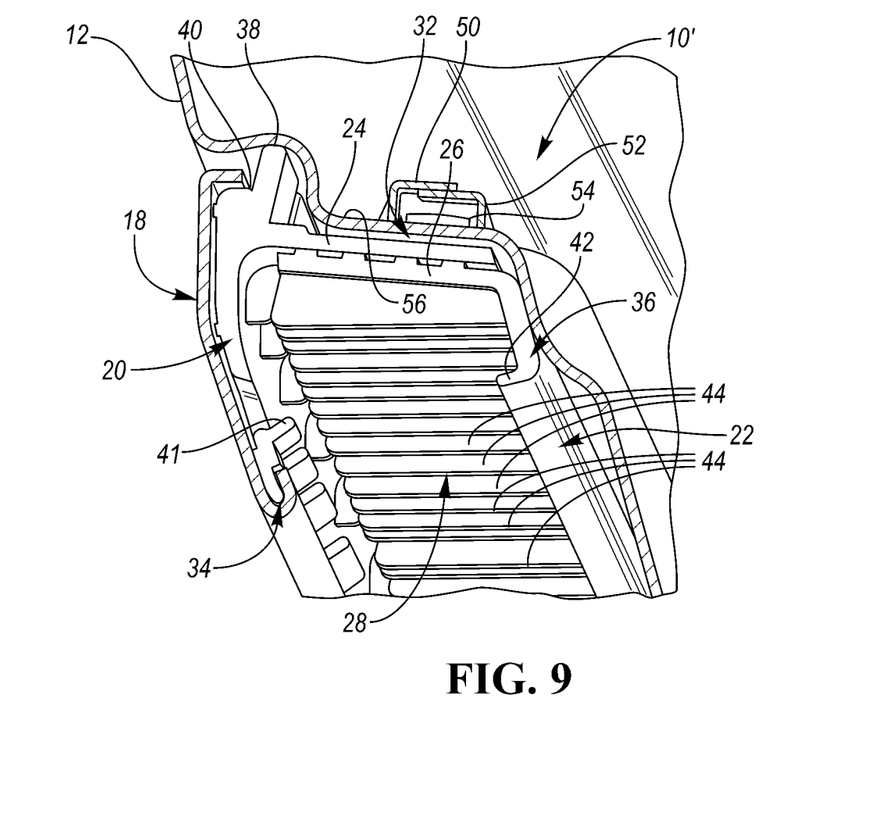
FIG. 9 is a bottom perspective view, partially broken away and in cross section, of a trim assembly of yet another embodiment of the present invention but including a series of standoff rib portions extending downwardly from a central portion of a U-shaped retainer.

Referring now to FIGS. 3-9, there are illustrated multiple embodiments of a vehicular window or molding assembly of the present invention. The embodiments of FIGS. 3, 4, 6, and 8 are provided for a rear passenger compartment door frame and the embodiments of FIGS. 5, 7 and 9 are provided for a driver's side door.

In all embodiments, a decorative molding assembly, generally indicated at 10 (or 10' for FIGS. 5, 7 and 9) for a vehicle door frame 12 having a window opening 14 for a translating window pane 16 moveable between an open position and a closed position is provided. The assembly 10 (or 10') includes a decorative outer trim member, generally indicated at 18, and first and second channel members, generally indicated at 20 and 22, respectively, fixedly connected together at overlapping portions 24 and 26, respectively, of the channel members 20 and 22 to form an inverted, U-shaped retainer, generally indicated at 28, to receive and retain a window pane seal, generally indicated at 30.

A central portion 32 of the retainer 28 is formed by the overlapping portions 24 and 26. A first leg portion 34 of the retainer 28 is formed by the first channel member 20 and a second leg portion 36 of the retainer 28 is formed by the second channel member 22. Each of the channel members 20 and 22 is integrally molded to form a unitary construction. The first channel member 20 may include an upwardly extending, anti-rotation rib portion 38 configured to sealingly engage the door frame 12 and to reduce rotation of the channel members 20 and 22 of the assembly (10 or 10') during closure of the window pane 16. Such rotation is undesirable for a number of reasons.

The first channel member 20 may be T-shaped and the anti-rotation rib portion 38 may be formed at an upper tip portion 40 of the T-shaped channel member 20.

Each of the leg portions 34 and 36 may include an inwardly extending retaining flange 41 and 42, respectively, to receive and retain the window seal 30.

The assembly 10 (or 10') may further include a plurality of spaced, standoff, sealing rib portions 44 (i.e. FIG. 9) extending downwardly from the central portion 32 of the U-shaped retainer 28 and integrally formed with the second channel member 22.

The first channel member 20 may be T-shaped and the second channel member 22 may be J-shaped. The channel members 20 and 22 may be molded from at least one thermoplastic. The at least one thermoplastic may be a thermoplastic blend. For example, each of the channel members 20 and 22 may be formed from PC-ASA or PC-ABS thermoplastic.

The assembly 10 may further include an adhesive sealant 46 to fixedly connect the overlapping portions 24 and 26 of the channel members 20 and 22, respectively, together. The adhesive sealant 46 may be a polyurethane (i.e. PUR) adhesive sealant. Alternatively, or in addition, the overlapping portions 24 and 26 may be held together by welding and/or double-sided adhesive tape.

The assembly may further include double-sided or coated, foam seal tape 48 to adhesively and sealingly secure the central portion 30 of the retainer 28 to a body or door frame 12 of the vehicle.

The trim member 18 may be a metallic trim member. The metallic trim member 18 may be comprised of a nickel chromium alloy and/or may be comprised of a nickel containing stainless steel alloy. The trim member 18 may be referred to as a chrome upper bright or a chrome cap, stainless steel member 18.

Referring to FIG. 9, the door frame 12 may have a plurality of spaced, apertured flange portions 50 and 52 whose apertures are aligned with a raised apertured collar 54 formed on the inner surface 56 of the frame 12. All of the apertures are aligned to receive and retain a threshold fastener (not shown) which extends into the overlapping flange portions 50 and 52 to help secure the retainer 28 to the frame 12.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicular window trim assembly comprising:
    a decorative outer trim member; and
    first and second channel members fixedly connected together at overlapping portions of the channel members to form an inverted, U-shaped retainer to receive and retain a one-piece window seal, a central portion of the retainer being formed by the overlapping portions, a first leg portion of the retainer being formed by the first channel member and a second leg portion of the retainer being formed by the second channel member, wherein each of the channel members comprises an integral injection molded body of plastic and wherein each of the leg portions includes an inwardly extending retaining flange to receive and retain the window seal, wherein the first channel member is T-shaped and includes a top portion with an upper tip portion being disposed above the overlapping portions, wherein an anti-rotation rib portion is formed above the upper tip portion of the T-shaped channel member, and wherein the anti-rotation rib portion is configured to seal against a body of a vehicle and reduce rotation of the assembly during closure of a window pane.

2. The assembly as claimed in claim 1 further comprising a plurality of spaced, standoff rib portions extending downwardly from the central portion of the U-shaped retainer.

3. The assembly as claimed in claim 1, wherein the second channel member is J-shaped.

4. The assembly as claimed in claim 1, wherein the trim member is attached to the top portion of the T-shaped first channel member.

5. The assembly as claimed in claim 4, wherein the trim member is comprised of a nickel chromium alloy.

6. The assembly as claimed in claim 4, wherein the trim member is comprised of a nickel containing stainless steel alloy.

7. The assembly as claimed in claim 1, wherein the channel members are molded from at least one thermoplastic.

8. The assembly as claimed in claim 7, wherein the at least one thermoplastic is a thermoplastic blend.

9. The assembly as claimed in claim 1 further comprising an adhesive sealant to fixedly connect the overlapping portions of the channel members together.

10. The assembly as claimed in claim 9, wherein the adhesive sealant is a polyurethane adhesive sealant.

11. The assembly as claimed in claim 1 further comprising foam seal tape to adhesively and sealingly secure the central portion of the retainer to a body of a vehicle.

12. A decorative molding assembly for a vehicle door frame having a window opening for a translating window pane moveable between an open position and a closed position, the assembly comprising:
 a decorative outer trim member; and
 first and second channel members fixedly connected together at overlapping portions of the channel members to form an inverted, U-shaped retainer to receive and retain a one-piece window pane seal, a central portion of the retainer being formed by the overlapping portions, a first leg portion of the retainer being formed by the first channel member and a second leg portion of the retainer being formed by the second channel member, wherein each of the channel members comprises an integral injection molded body of plastic and wherein each of the leg portions includes an inwardly extending retaining flange to receive and retain the window pane seal, wherein the first channel member includes an anti-rotation rib portion extending from the first channel member, spanning across one end of the outer trim member and engaging the door frame to provide a seal and to reduce rotation of the assembly during closure of the window pane, wherein the first channel member is T-shaped and the second channel member is J-shaped.

13. The assembly as claimed in claim 12, wherein the anti-rotation rib portion is formed at an upper tip portion of the T-shaped channel member.

14. The assembly as claimed in claim 12 further comprising a plurality of spaced, standoff rib portions extending downwardly from the central portion of the U-shaped retainer.

15. The assembly as claimed in claim 12, wherein the trim member is a metallic trim member.

16. The assembly as claimed in claim 12, wherein the channel members are molded from at least one thermoplastic.

* * * * *